United States Patent Office 3,784,556
Patented Jan. 8, 1974

3,784,556
CERTAIN 2-AMINO-6-PHENYL-4H-s-TRIAZOLO
[1,5-a][1,4]BENZODIAZEPINES
André Gagneux, Basel, Roland Heckendorn, Arlesheim, and René Meier, Buus, Basel-Land, Switzerland, assignors to Ciba-Geigy Corporation, Ardsley, N.Y.
No Drawing. Filed July 19, 1972, Ser. No. 273,072
Claims priority, application Switzerland, July 23, 1971, 10,884/71
Int. Cl. C07d 57/02
U.S. Cl. 260—308 R               9 Claims

ABSTRACT OF THE DISCLOSURE

Compounds of the class of 2-amino-6-phenyl-4H-s-triazolo[1,5-a][1,4]benzodiazepines, their 5-oxides and their pharmaceutically acceptable acid addition salts have valuable pharmacological properties, in particular anticonvulsant effectiveness, and are active ingredients for therapeutic preparations. Specific embodiments are 2-amino - 6 - phenyl - 8-chloro-4H-s-triazolo[1,5-a][1,4]benzodiazepine, 2-amino-6-(o-fluorophenyl)-8-chloro-4H-s-triazolo[1,5-a][1,4]benzodiazepine and 2 - amino-6-(o-chlorophenyl) - 8 - chloro - 4H-s-triazolo[1,5-a][1,4]benzodiazepine.

DETAILED DESCRIPTION

The present invention relates to new diazepine derivatives, to processes for their production, to therapeutic preparations containing the new compounds, and to the use thereof.

The compounds according to the invention correspond to the General Formula I

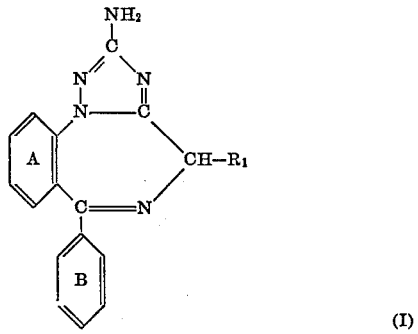

(I)

wherein $R_1$ represents hydrogen or an alkyl group having 1 to 3 carbon atoms, and wherein each of the rings A and B, independently of the other, is unsubstituted or substituted by one or more chlorine atoms, fluorine atoms, bromine atoms, trifluoromethyl groups, nitro groups and/or alkyl and/or alkoxy groups having from 1 to 6 carbon atoms.

The invention also relates to the 5-oxides and the addition salts of the compounds of the General Formula I with inorganic and organic acids.

As alkyl group $R_1$ is, e.g. the methyl, ethyl or propyl group. Alkyl groups each having 1 to 6 carbon atoms suitable as substituents of the rings A and B are, e.g. the methyl, ethyl, propyl, isopropyl, butyl, isobutyl, tert.-butyl, pentyl, isopentyl, neopentyl, tert.-pentyl or hexyl group; and suitable alkoxy groups having 1 to 6 carbon atoms are, e.g. the methoxy, ethoxy, propoxy, isopropoxy, butoxy, isobutoxy, pentyloxy, isopentyloxy or hexyloxy-groups. In a preferred class of compounds of General Formula I $R_1$ is hydrogen and each of the rings A and B independently of the other is unsubstituted or substituted by a single substituent defined under Formula I. Among these substituents, chlorine, fluorine, bromine, trifluoromethyl groups and the nitro groups are preferred. A substituent of ring A is preferably in the 8-position and is, in particular, one of the mentioned halogen atoms, especially chlorine, also the nitro group or the trifluoromethyl group. Ring B is preferably unsubstituted, or substituted by fluorine, chlorine, bromine or the trifluoromethyl group in any desired position, particularly, however, by fluorine or chlorine in the o-position.

The compounds of the General Formula I, their 5-oxides and their addition salts with inorganic and organic acids possess valuable pharmacological properties. They have, in particular, an anticonvulsive action, such as can be shown, for example, on the mouse in the pentetrazole-convulsion test after administration of oral doses of from ca. 0.05 mg./kg., as well as in the strychnine convulsion test. The following are of special importance: 2-amino-6-phenyl-8-chloro-4H - s - triazolo[1,5-a][1,4]benzodiazepine, 2 - amino - 6 - (o - fluorophenyl) - 8 - chloro-4H-s-triazolo[1,5-a][1,4]benzodiazepine and 2-amino-6-(o-chlorophenyl) - 8 - chloro - 4H - s - triazolo[1,5-a][1,4]benzodiazepine. Compared with their anticonvulsive action, the sedative action of the new compounds is less pronounced. By virtue of the mentioned properties and others, which can be determined by selected standard tests [cp. W. Theobald and H. A. Kunz, Arzneimittelforsch., 13, 122 (1963), and also W. Theobald et al., Arzneimittelforsch., 17, 561 (1967)], the compounds of the General Formula I, their 5-oxides and their pharmaceutically acceptable addition salts with inorganic and organic acids constitute active substances for tranquilizers and anticonvulsants which can be administered, for example, for the treatment of conditions of stress and agitation with no, or with only negligible, effect on vigility; as well as for the treatment of epilepsy.

The compounds of the General Formula I, their 5-oxides and their acid addition salts are produced by the hydrolysis of a compound of the General Formula II

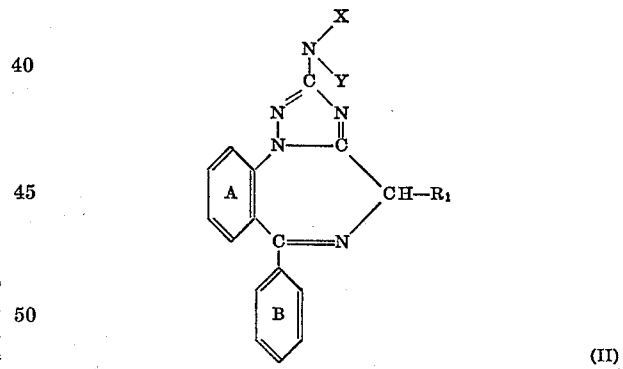

(II)

wherein X represents an acyl radical and Y hydrogen, or X and Y together represent the carbonyl group, $R_1$ has the meaning given under Formula I, and the rings A and B can be substituted as defined under Formula I, or of its 5-oxide; and, optionally, the conversion of the obtained compounds of the General Formula I into an addition salt with an inorganic or organic acid.

In the starting materials of the General Formula II, the preparation of which is described below, the acyl radical X on its own is, e.g. the acyl radical of a carboxylic acid, especially a lower alkanoyl group such as the acetyl, formyl, propionyl, butyryl or valeryl group, or an arene-carbonyl group such as the benzoyl group; or the acyl radical of a monofunctional derivative of carbonic acid, such as the methoxycarbonyl, ethoxycarbonyl, butoxycarbonyl, tert.butoxycarbonyl, cyclohexylcarbonyl, benzyl-oxycarbonyl or phenoxycarbonyl group. The compounds of the General Formula II wherein X and Y together represent the carbonyl group are isocyanates.

The hydrolysis can be performed with the aid of an alkali metal hydroxide, e.g. potassium or sodium hydroxide, at a temperature of ca. 50° to 120° C., e.g. in a lower alkanol such as methanol or ethanol, or, if necessary, in a higher boiling organic solvent containing hydroxyl groups, such as, e.g. ethylene glycol or diethylene glycol, or in a lower monoalkyl ether of such a glycol. Furthermore, hydrolysis may also be carried out in an acid medium, e.g. with hydrogen bromide or hydrogen chloride in acetic acid, or with alkanolic hydrochloric acid at a temperature of ca. 50° to 120° C., or at boiling temperature of the reaction mixture. Moreover, the isocyanates embraced by the General Formula II can be hydrolyzed to compounds of the General Formula I also by, for example, the boiling of them with aqueous dioxane containing a little sulphuric acid.

A special embodiment of the process according to the invention comprises the heating in an acid medium, not of an isocyanate embraced by the General Formula II, but of the precursor thereof, an acid azide of the General Formula III

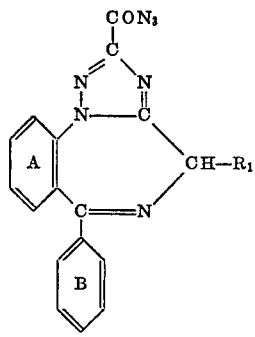

(III)

wherein $R_1$ has the meaning given under Formula I, and the rings A and B can be substituted as defined there, or of the 5-oxide thereof; and, optionally, the conversion of the obtained compound of the General Formula I into an addition salt with an inorganic or organic acid. For example, an acid azide of the General Formula III, or its 5-oxide, is refluxed in aqueous dioxane containing a catalytic amount of a mineral acid such as hydrochloric acid, hydrobromic acid or, in particular, sulphuric acid, refluxing being continued at least until the evolution of nitrogen is completed. There is then obtained, as an intermediate, the corresponding isocyanate embraced by the General Formula II, which is immediately hydrolyzed to the compound of the General Formula I. It is also possible to use as the acid medium, e.g. acetic acid at the boiling temperature, the acid preferably having a water content of ca. 2 to 25%; other aqueous organic acids are however suitable as reaction media, such as formic acid or propionic acid.

The starting materials of the General Formula II are obtained, e.g. commencing with compounds of the General Formula IV

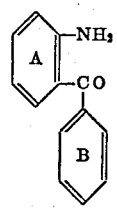

(IV)

wherein the rings A and B can be substituted as defined under Formula I. Such compounds are described in the literature, e.g. 2-amino-5-chlorobenzophenone [cp. F. D. Chattaway, J. Chem. Soc., 85, 344 (1904)] or 2-amino-2',5-dichlorobenzophenone [cp. L. H. Sternbach et al., J. Org. Chem., 26, 4488 (1961)]. The compounds of the General Formula IV are diazotized, and subsequently the obtained diazonium salts coupled with (2-chloroalkaneamido)-malonic acid diethyl esters of which the alkaneamido group contains 2 to 5 carbon atoms, particularly with (2-chloroacetamido)-malonic acid diethyl ester [cp. Ajay Kumar Bose, J. Indian Chem. Soc., 31, 108–110 (1954)], to give the corresponding (2-chloroalkaneamido)-(2-benzoyl-phenylazo-malonic acid diethyl esters, especially (2-chloroacetamido)-(2-benzoyl-phenylazo)-malonic acid diethyl esters. The coupling products are then converted, by treatment with sodium hydroxide and afterwards with hydrochloric acid, into the compounds of the General Formula V

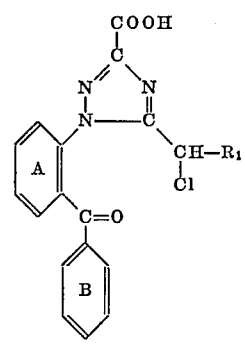

(V)

wherein $R_1$ has the meaning given under Formula I, and the rings A and B can be substituted as defined there. These compounds are reacted, optionally after pretreatment with potassium iodide, with aqueous ammonia or with hexamethylenetetramine, with the chlorine atom being consequently replaced by the amino group, and simultaneously, with elimination of water, ring closure occurring to give carboxylic acids of the General Formula VII

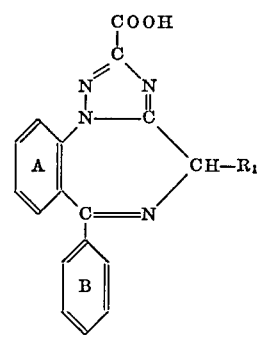

(VII)

wherein $R_1$ has the meaning given under Formula I, and the rings A and B can be substituted as defined there. It is also possible, however, to firstly react the compounds of the General Formula V with sodium azide, in the presence of potassium iodide, to compounds of the General Formula VI

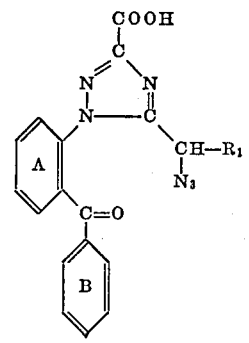

(VI)

wherein R₁ has the meaning given under Formula I, and the rings A and B can be substituted as defined there; and to cyclize these compounds with triphenylphosphine, with the evolution of nitrogen, to compounds of the General Formula VII.

The carboxylic acids of the General Formula VII are converted in a manner known per se, e.g. with thionyl chloride, into their acid chloride-hydrochlorides, and these reacted with at least the double-molar amount of an alkali metal azide such as sodium azide, in an inert organic solvent such as, e.g. acetone, to give the acid azides of the previously given General Formula III.

The acid azides of the General Formula III are either used direct as starting materials for a particular embodiment of the process according to the invention, or converted firstly, according to various variants of the Curtius-decomposition, into compounds of the General Formula II. For example, there are obtained, by heating of the acid azide in anhydrous carboxylic acids, especially in lower alkanoic acids, which preferably have a content of the corresponding acid anhydride, to temperatures of between ca. 100° and 130° C. or at the boiling point of the employed carboxylic acid, e.g. by boiling in an acetic acid/acetic anhydride mixture, compounds of the General Formula II having as X the acyl radical of a carboxylic acid, especially a lower alkanoyl group, e.g. the acetyl group, and hydrogen as Y. By the heating of the acid azides of the General Formula III with hydroxy compounds such as, e.g. methanol, ethanol, butanol, cyclohexanol or benzyl alcohol, in the presence or absence of an inert organic solvent such as, e.g. benzene or toluene, until cessation of the evolution of nitrogen, there are obtained compounds of the General Formula II wherein X is the acyl radical of a monofunctional derivatives of carbonic acid, e.g. the methoxycarbonyl, ethoxycarbonyl, butoxycarbonyl, cyclohexyloxycarbonyl or benzyloxycarbonyl group, and Y is hydrogen. Optionally, such groups X, e.g. the benzyloxycarbonyl group, can be replaced by lower alkanoyl groups, e.g. by the acetyl group, by the heating of the compounds concerned in a mixture, containing hydrogen bromide, of a lower alkanoic acid and its anhydride, e.g. in the mixture of acetic acid and acetic anhydride. The isocyanates embraced by the General Formula II wherein X and Y together represent the carbonyl group are obtained, e.g. according to a variant of the Curtius-decomposition, by the heating of the acid azides of the General Formula III in an inert organic solvent, e.g. in benzene or toluene, until the evolution of nitrogen ceases; or, according to the Lossen-decomposition, by the heating of the hydroxamic acids corresponding to the carboxylic acids of the General Formula VII with thionyl chloride, acetic anhydride or phosphorus pentoxide; or the heating of the O-acyl derivatives of the mentioned hydroxamic acids in inert organic solvents.

The compounds of the General Formula I obtained by the processes according to the invention are optionally converted, in the usual manner, into their addition salts with inorganic and organic acids. For example, the acid desired as salt component is added to a solution of a compound of the General Formula I in an organic solvent. Organic solvents in which the formed salt is difficultly soluble are preferably chosen for the reaction, so that the salt can be separated by filtration. Such solvents are, e.g. methanol, ether, acetone, methyl ethyl ketone, acetone/ether, acetone/ethanol, methanol/ether or ethanol/ether.

A further method of preparation of the addition salts is the concentration by evaporation in vacuo of equimolar or equivalent organic solutions of compounds of the General Formula I and the acid desired as salt component.

It is possible to use as pharmaceutical active substances, instead of free bases, pharmaceutically acceptable acid addition salts, i.e. salts with such acids of which the anions are not toxic in the case of the dosage amounts in question. Moreover, it is of advantage if the salts to be used as pharmaceutical active substances crystallize well and are not, or only slightly, hygroscopic. The following may be used, for example, for salt formation with compounds of the General Formula I: hydrochloric acid, hydrobromic acid, sulphuric acid, phosphoric acid, methanesulphonic acid, ethanesulphonic acid, 2-hydroxyethanesulphonic acid or citric acid.

The new active substances are administered orally, rectally or parenterally. The dosage amount depends on the mode of administration, on the species, on the age and on the individual condition. The daily doses of the free bases, of their 5-oxides, or of pharmaceutically acceptable salts of the free bases vary between 0.1 mg./kg. and 2.0 mg./kg. for warm-blooded animals. Suitable dosage units, such as dragées, tablets, suppositories or ampoules, preferably contain 0.5–25 mg. of an active substance according to the invention.

Dosage units for oral administration contain as active substance preferably between 1–50% of a compound of the General Formula I, or of a pharmaceutically acceptable salt thereof. The dosage units are prepared by the combination of the active substance with, e.g. solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols, to form tablets or dragée cores. The dragée cores are coated, for example, with concentrated sugar solutions which may also contain, e.g. gum arabic, talcum and/or titanium dioxide; or with a lacquer dissolved in readily volatile organic solvents or solvent mixtures. Dyestuffs can be added to these coatings in order to facilitate, for example, identification of the various doses of active substance.

Other suitable oral dosage units are hard gelatine capsules, as well as soft closed capsules made from gelatine and a softener, such as glycerin. The hard capsules contain the active substance preferably as a granulate, in admixture, for example, with fillers such as maize starch and/or lubricants such as talcum or magnesium stearate, and optionally stabilizers such as sodium metabisulphite ($Na_2S_2O_5$) or ascorbic acid. In soft capsules, the active substance is preferably dissolved or suspended in suitable liquids such as polyethylene glycols, to which likewise stabilizers may be added.

Suitable dosage units for rectal administration are, e.g. suppositories consisting of a combination of an active substance and a suppository foundation substance. The following, for example, are suitable as base substances: natural or synthetic triglycerides, paraffin hydrocarbons, polyethylene glycols or higher alkanols. Hard gelatine capsules consisting of a combination of the active substance and a foundation substance are likewise suitable. Suitable foundation substances are, e.g. liquid triglycerides, polyethylene glycols or paraffin hydrocarbons.

Ampoules for parenteral administration, particularly for intramuscular administration, preferably contain a water-soluble salt of an active substance in a concentration of preferably 0.5–5%, optionally together with suitable stabilizers and buffer substances, in aqueous solution.

The following specifications further illustrate the production of tablets, dragées, capsules, suppositories and ampoules:

(a) An amount of 50 g. of 2-amino-6-phenyl-8-chloro-4H-s-triazolo[1,5-a][1,4]benzodiazepine is mixed with 175.80 g. of lactose and 169.70 g. of potato starch; the mixture is moistened with an alcoholic solution of 10 g. of stearic acid, and then granulated through a sieve. After the granulate has dried, the following ingredients are mixed in: 160 g. of potato starch, 200 g. of talcum, 2.50 g. of magnesium stearate and 32 g. of colloidal silicon dioxide; the mixture is subsequently pressed to obtain 10,000 tablets each weighing 80 mg. and each containing 5 mg. of active substance; the tablets may optionally be provided with grooves to render possible a more precise adjustment of the dosage amount.

(b) A granulate is produced from 50 g. of 2-amino-6-phenyl - 8 - chloro - 4H-s-triazolo[1,5-a][1,4]benzodiazepine, 175.90 g. of lactose and the alcoholic solution of 10 g. of stearic acid; after drying, the granulate is mixed with 56.0 g. of colloidal silicon dioxide, 165 g. of talcum, 20 g. of potato starch and 2.50 g. of magnesium stearate; and the mixture finally pressed out to obtain 10,000 dragée cores. These are subsequently coated with a concentrated syrup made from 502.28 g. of crystallized saccharose, 6 g. of shellac, 10 g. of gum arabic, 0.22 g. of dyestuff and 1.5 g. of titanium dioxide; the thus coated dragée cores are then dried. The obtained dragées each weigh 100 mg. and each contain 5 mg. of active substance.

(c) To produce 1000 capsules each containing 2 mg. of active substance, an amount of 2.0 g. of 2-amino-6-phenyl - 8 - chloro-4H-s-triazolo[1,5-a][1,4]benzodiazepine is mixed with 256 g. of lactose; the mixture is uniformly moistened with an aqueous solution of 2 g. of gelatine, and then granulated through a suitable sieve (e.g. sieve III, according to Ph. Helv. V). The granulate is mixed with 10.0 g. of dried maize starch and 15.0 g. talcum, and the mixture evenly filled into 1000 hard gelatine capsules, size 1.

(d) A suppository mixture is prepared from 1.0 g. of 2 - amino - 6 - phenyl-8-chloro-4H-s-triazolo[1,5-a][1,4]benzodiazepine and 169.0 g. of adeps solidus; from the prepared mixture are then poured 100 suppositories each containing 10 mg. of active substance.

Analogous preparations can be produced by using, instead of the given amounts of 2-amino-6-phenyl-8-chloro-4H - s-triazolo[1,5-a][1,4]benzodiazepine, half the amounts in each case of 2-amino-6-(o-chlorophenyl)-8-chloro - 4H-s-triazolo[1,5-a][1,4]benzodiazepine or of 2 - amino - 6 - (o-fluorophenyl)-8-chloro-4H-s-triazolo-[1,5-a][1,4]benzodiazepine.

The following examples further illustrate the production of the new compounds of the General Formula I and of intermediates not hitherto described; the examples do not, however, in any way limit the scope of the invention. Temperatures are expressed in degrees centigrade.

EXAMPLE 1

(a) An amount of 0.352 g. (0.001 mole) of N-(6-phenyl-8-chloro-4H-s-triazolo[1,5 - a][1,4]benzodiazepin-2-yl)-acetamide is dissolved in a mixture of 20 ml. of methanol and 1.5 ml. (0.0015 mole) of 1 N sodium hydroxide solution, and the solution refluxed for 3 hours. The solvent is afterwards evaporated off in vacuo, and the residue washed three times with 3 ml. of 80% methanol each time. After recrystallization from isopropanol, 4-amino-6-phenyl-8-chloro - 4H - s - triazolo[1,5-a][1,4] benzodiazepine, M.P. 213–215°, is obtained.

The same amine can be obtained, in an analogous manner, by hydrolysis also of 0.394 g. of N-(6-phenyl-8-chloro - 4H - s - triazolo[1,5-a][1,4]benzodiazepin-2-yl)-valeramide.

The amides required as starting materials are produced as follows:

(b) A solution of 58.0 g. (0.25 mole) of 2-amino-5-chlorobenzophenone [cp. F. D. Chattaway, J. Chem. Soc., 85, 344 (1904)] in 310 ml. of glacial acetic acid/conc. hydrochloric acid (4:1) is diazotized at room temperature, whilst stirring is maintained, with 50 ml. (0.25 mole) of aqueous sodium nitrite solution. An amount of 150 g. of ice is added to the obtained diazonium salt solution, followed by the rapid addition dropwise of a solution of 52.4 g. (0.208 mole) of (2-chloroacetamido)-malonic acid diethyl ester [cp. Ajay Kumar Bose, J. Indian Chem. Soc., 31, 108–110 (1954)] in 600 ml. of acetone. An addition is subsequently made dropwise at 5–10°, in the course of 20 minutes, of a solution of 276.0 g. (2 moles) of potassium carbonate in 500 ml. of water; stirring is continued for one hour, and benzene and saturated sodium chloride solution are then added. The benzene solution is separated, washed with saturated sodium chloride solution, dried over sodium sulphate, and concentrated by evaporation to obtain 121 g. of crude (2-benzoyl - 4 - chlorophenylazo)-(2-chloroacetamido)-malonic acid diethyl ester. This crude product is dissolved in 1.5 litres of dioxane; an amount of 36 g. (0.9 mole) of sodium hydroxide dissolved in 2 litres of water is then added, the mixture stirred for 30 minutes, and the dioxane evaporated off in vacuo. The residue is diluted with 500 ml. of water, and 20 g. of active charcoal added; the mixture is well stirred and then filtered through purified diatomaceous earth. An addition is made to the filtrate, with thorough stirring, of 2 N hydrochloric acid until an acid reaction to a Congo-red indicator is obtained; the precipitated carboxylic acid is filtered off under suction, washed with water and then recrystallized from hot methanol. The obtained crystals, containing an equimolar amount of methanol, of 1-(2-benzoyl-4-chlorophenyl)-5-(chloromethyl) - 1H-1,2,4-triazole-3-carboxylic acid sinter at 137–138° and melt, with decomposition, at 169–171°.

(c) An amount of 33.2 g. (0.200 mole) of potassium iodide is dissolved in 85 ml. of water, and the obtained solution diluted with 850 ml. of dioxane; an addition is made at 25°, with stirring, of 71.5 g. (0.175 mole) of the compound produced according to (b), and the solution heated for one hour at 45–50°. An amount of 0.5 litre of concentrated aqueous ammonia solution is thereupon added; the mixture is heated for 2 hours at 45–50°, and concentrated in vacuo. The residue is dissolved in 2 litres of water, and an addition then made of 2 N hydrochloric acid until the solution shows an acid reaction to a Congo-red indicator. The free carboxylic acid precipitates; it is filtered off under suction, washed with water until neutral, subsequently washed with methanol, and dried in vacuo at 120–130°. The obtained 6-phenyl-8-chloro-4H-s-triazolo[1,5 - a][1,4]benzodiazepine-2-carboxylic acid decomposes at 170°.

This carboxylic acid can also be produced according to (d) from the chloromethyl compound obtained by the procedure (b):

(d) An amount of 0.408 g. (0.001 mole) of the chloromethyl compound obtained according to (b), containing an equimolar amount of methanol, and 0.320 g. (0.003 mole) of hexamethylenetetraamine is dissolved in 20 ml. of ethanol, and the solution refluxed for 12 hours. The solution is then concentrated at 40° in vacuo, and the residue dissolved in 20 ml. of 0.05 N sodium hydroxide solution; 2 N hydrochloric acid is then added until the solution shows an acid reaction to a Congo-red indicator, and the precipitated crude product processed as under (c). The obtained 6-phenyl-8-chloro-4H-s-triazolo-[1,5-a][1,4]benzodiazepine - 2 - carboxylic acid melts at 170° with decomposition.

(e) An amount of 6.77 g. (0.020 mole) of 6-phenyl-8-chloro-4H-s-triazolo[1,5 - a][1,4]benzodiazepine-2-carboxylic acid is covered by 70 ml. of thionyl chloride, and the whole refluxed for one hour. The clear yellow solution is concentrated at 40° in vacuo; an addition is then made, to effect the total removal of the thionyl chloride, of 100 ml. of abs. toluene, and concentration by evaporation again carried out. The obtained crude 6-phenyl-8-chloro - 4H - s-triazolo[1,5-a][1,4]benzodiazepine-2-carboxylic acid chloride hydrochloride is suspended in 250 ml. of abs. acetone; a solution of 6.5 g. (0.100 mole) of sodium azide in 25 ml. of water and 25 ml. of acetone is added to the suspension, and the whole vigorously stirred for 10 minutes. The acetone solution is thereupon decanted from the inorganic substances, and concentrated in vacuo at 40° to ca. 50 ml. Additions are made to the concentrate of 200 ml. of methylene chloride and 100 ml. of 5% sodium bicarbonate solution; the organic phase is separated and washed with 200 ml. of water. After drying over sodium sulphate, and concentration at 30° in vacuo, a yellow viscous residue is obtained which, on washing with ether, solidifies in crystalline form. 6-phenyl-8-chloro - 4H - s-triazolo[1,5-a][1,4]benzodiazepine-2-carboxylic acid azide is obtained, which decomposes at 130°.

(f) An amount of 7.27 g. (0.020 mole) of 6-phenyl-8-chloro-4H-s-triazolo [1,5-a][1,4]benzodiazepine-2-carboxylic acid azide and 2.3 g. (0.0213 mole) of benzyl alcohol is dissolved in 100 ml. of abs. benzene, and the solution refluxed for 2 hours. The solution is then concentrated in vacuo at 40°, and the crude residue refluxed with 200 ml. of ether for one hour, whereby crystallization occurs. After cooling to 10°, the crystals are filtered off under suction; the filter-residue is afterwards washed with ether, and dried in vacuo at 100–120° to obtain 6-phenyl-8-chloro-4H-s-triazolo[1,5-a][1,4]benzodiazepine - 2 - carbamic acid benzyl ester having a decomposition point of 220–225°.

(g) An amount of 6.65 g. (0.015 mole) of 6-phenyl-8-chloro - 4H - s - triazolo[1,5-a][1,4]benzodiazepine-2-carbamic acid benzyl ester is dissolved in 75 ml. of glacial acetic acid and 7.5 ml. of acetic anhydride, and the solution saturated at 100–110° with hydrogen bromide. The mixture is stirred for a further 2 hours at 110–120°, and then concentrated at 60° in vacuo. The residue is triturated with 100 ml. of abs. ether; filtration under suction is carried out, and the filter residue then washed with a further 100 ml. of abs. ether. The crude product is dissolved in 100 ml. of methylene chloride and 100 ml. of 5% sodium bicarbonate solution; the organic phase is separated, washed with 100 ml. of water, dried over sodium sulphate, and concentrated at 40° in vacuo. After trituration with 50 ml. of cold methanol, the viscous residue crystallizes. The crystals are filtered off under suction, washed with methanol, and dried at 100–120° in vacuo to obtain N-(6-phenyl-8-chloro-4H-s-triazolo[1,5-a][1,4]benzodiazepin-2-yl)-acetamide, M.P. 236–238°.

(h) The N-substituted acetamide required as starting material can be produced from the corresponding carboxylic acid azide also in one stage as follows:

An amount of 0.364 g. (0.001 mole) of 6-phenyl-8-chloro - 4H - s - triazolo[1,5-a][1,4]benzodiazepine-2-carboxylic acid azide [cp. (e)] is dissolved in 5 ml. of glacial acetic acid, and 0.51 g. (0.005 mole) of acetic anhydride added to the solution. The mixture is refluxed for 15 minutes, and then, whilst still warm, diluted with 20 ml. of water. After 30 minutes' stirring at 40°, the mixture is cooled to 5°, and the precipitated reaction product filtered off under suction. The filter residue is washed with water, and then crystallized from methanol. The product thus obtained is N-(6-phenyl-8-chloro-4H-s-triazolo[1,5-a][1,4]benzodiazepin - 2 - yl)-acetamide, M.P. 236–238°.

From the same amount of acid azide, with the use of 0.93 g. (0.005 mole) of valeric anhydride in 5 ml. of valeric acid, and with 15 minutes' heating at 130° bath temperature instead of boiling, there is obtained, in an analogous manner, N - (6-phenyl-8-chloro-4H-s-triazolo-[1,5-a][1,4]benzodiazepin-2-yl)-valeramide, M.P. 188–190°.

EXAMPLE 2

(a) An amount of 0.382 g. (0.001 mole) of 6-phenyl-8-chloro - 4H - s - triazolo[1,5-a][1,4]benzodiazepine-2-carbamic acid ethyl ester is dissolved in 20 ml. of methanol and 1.25 ml. of 1 N sodium hydroxide solution, and the solution refluxed for 24 hours. The solvent is then evaporated off in vacuo, and the residue washed three times with 5 ml. of 75% methanol each time. After recrystallization of the residue from isopropanol, 2-amino-6-phenyl-8-chloro - 4H - s - triazolo[1,5-a][1,4]benzodiazepine, M.P. 213–215°, is obtained.

In a fully analogous manner, 6-phenyl-8-chloro-4H-s-triazolo[1,5-a][1,4]benzodiazepine - 2 - carbamic acid methyl ester and 6-phenyl-8-chloro-4H-s-triazolo[1,5-a]-[1,4]benzodiazepine-2-carbamic acid cyclohexyl ester can be hydrolyzed to 2-amino-6-phenyl-8-chloro-4H-s-triazolo-[1,5-a][1,4]benzodiazepine.

The starting materials are produced as follows:

(b) An amount of 7.3 g. (0.02 mole) of 6-phenyl-8-chloro - 4H - s - triazolo[1,5-a][1,4]benzodiazepine-2-carboxylic acid azide [cp. Examples 1(b) to (e)] is dissolved in a mixture of 50 ml. of benzene and 10 ml. of abs. ethanol, and the solution refluxed for 5 hours. The reaction solution is thereupon concentrated in vacuo, and the residue washed three times with 20 ml. of methanol each time. After recrystallization from benzene, 6-phenyl-8 - chloro - 4H - s - triazolo[1,5-a][1,4]benzodiazepine-2-carbamic acid ethyl ester is obtained, decomposition point 233°.

The following are obtained in an analogous manner:

From 0.73 g. (0.002 mole) of acid azide and 1 ml. of methanol in 5 ml. of benzene: 6-phenyl-8-chloro-4H-s-triazolo[1,5-a][1,4]benzodiazepine - 2 - carbamic acid methyl ester, decomposition point 245° after recrystallization from benzene;

From 0.73 g. (0.002 mole) of acid azide and 0.22 g. (0.0022 mole) of cyclohexanol in 5 ml. of benzene: 6-phenyl - 8 - chloro-4H-s-triazolo[1,5-a][1,4]benzodiazepine-2-carbamic acid cyclohexyl ester, decomposition point 240° after recrystallization from benzene/cyclohexane.

EXAMPLE 3

An amount of 18.2 g. (0.050 mole) of 6-phenyl-8-chloro-4H-s-triazolo[1,5-a][1,4]benzodiazepine - 2 - carboxylic acid azide [cp. Examples 1(b) to (e)] is dissolved in 300 ml. of pure dioxane. After the addition of 150 ml. of water and 1 ml. of 0.1 N sulphuric acid, the solution is refluxed for 2 hours. It is then concentrated at 40° in vacuo, the residue dissolved in 300 ml. of chloroform, and the chloroform solution washed three times with 100 ml. of 0.1 N sodium hydroxide solution each time. After drying over sodium sulphate, the chloroform solution is absorbed onto a column containing 340 g. of basic aluminium oxide, and eluted with chloroform/methanol mixtures.

The uniform fractions are combined, concentrated by evaporation, and recrystallized from isopropanol to thus obtain, after drying at 100–120°, 2-amino-6-phenyl-8-chloro - 4H-s-triazolo[1,5-a][1,4]benzodiazepine, M.P. 213–215°.

EXAMPLE 4

An amount of 1.82 g. (0.005 mole) of 6-phenyl-8-chloro-4H-s-triazolo[1,5-a][1,4]benzodiazepine - 2 - carboxylic acid azide is dissolved in 50 ml. of 80% acetic acid, and refluxed for 15 minutes. The acetic acid is afterwards evaporated off in vacuo, and the residue washed three times with 15 ml. of 75% methanol each time. After recrystallization from isopropanol, 2-amino-6-phenyl-8-chloro-4H-s-triazolo[1,5-a][1,4]benzodiazepine, M.P. 213–215°, is obtained.

EXAMPLE 5

(a) Analogously to Example 4, there are obtained from the given amounts (always corresponding to 0.005 mole) of the below listed 2-carboxylic acid azides, the corresponding 2-amino compounds:

From 1.99 g. of 6-(o-chlorophenyl)-8-chloro-4H-s-triazolo[1,5 - a][1,4]benzodiazepine - 2 - carboxylic acid azide: 2-amino - 6 - (o-chlorophenyl)-8-chloro-4H-s-triazolo[1,5-a][1,4]benzodiazepine, M.P. 183–188° (from isopropanol);

From 1.91 g. of 6-(o-fluorophenyl) - 8 - chloro-4H-s-triazolo[1,5-a][1,4]benzodiazepine - 2 - carboxylic acid azide: 2-amino - 6 - (o-fluorophenyl)-8-chloro-4H-s-triazo[1,5-a][1,4]benzodiazepine, M.P. 215–217° (from isopropanol);

From 1.82 g. of 6-(o-chlorophenyl - 4H - s - triazolo [1,5-a][1,4]benzodiazepine - 2 - carboxylic acid azide: 2-amino-6-(o-chlorophenyl) - 4H - s-triazolo[1,5-a][1,4] benzodiazepine;

From 2.07 g. of 6- α,α,α-trifluoro-o-tolyl)-8-chloro-4H-s-triazolo[1,5-a][1,4]benzodiazepine - 2 - carboxylic acid azide: 2-amino - 6 - α,α,α-trifluoro-o-tolyl)-8-chloro-4H-s-triazolo[1,5-a][1,4]benzodiazepine;

From 1.74 g. of 6-phenyl-8-fluoro-4H-s-triazolo[1,5-a][1,4]benzodiazepine-2-carboxylic acid azide: 2 - amino-6-phenyl - 8 - fluoro-4H-s-triazolo[1,5-a][1,4] benzodiazepine;

From 2.04 g. of 6-phenyl - 8 - bromo-4H-s-triazolo [1,5-a][1,4]benzodiazepine - 2 - carboxylic acid azide: 2-amino - 6 - phenyl-8-bromo-4H-s-triazolo[1,5-a][1,4] benzodiazepine;

From 1.99 g. of 6-phenyl-8-(trifluoromethyl)-4H-s-triazolo[1,5 - a][1,4]benzodiazepine - 2 - carboxylic acid azide: 2-amino - 6 - phenyl-8-(trifluoromethyl)-4H-s-triazolo[1,5-a][1,4]benzodiazepine;

From 1.87 g. of 6-phenyl-8-nitro-4H-s-triazolo[1,5-a][1,4]benzodiazepine-2-carboxylic acid azide: 2-amino-6-phenyl-8-nitro - 4H - s-triazolo[1,5-a][1,4]benzodiazepine;

The carboxylic acid azides required as starting materials are produced as follows.

(b) The following are obtained analogously to Example 1(b):

With the use of 66.5 g. (0.25 mole) of 2-amino-2',5-dichlorobenzophenone: 1-[2-(o-chlorobenzoyl) - 4 - chlorophenyl]-5-(chloromethyl - 1H - 1,2,4-triazole -3-carboxylic acid, M.P. 170–175° (decomposition; substance precipitated from solution in aqueous ammonia with 2 N hydrochloric acid);

With the use of 62.5 g. (0.25 mole) of 2-amino-5-chloro-2'-fluorobenzophenone: 1-[2-(o-fluorobenzoyl)-4-chlorophenyl]-5-(chloromethyl) - 1H - 1,2,4-triazole -3-carboxylic acid (solidified foam);

With the use of 58.0 g. (0.25 mole) of 2-amino-2'-chlorobenzophenone: 1-[o-(o-chlorobenzoyl)-phenyl] - 5-(chloromethyl - 1H - 1,2,4-triazole-3-carboxylic acid;

With the use of 75.0 g. (0.25 mole) of 2-amino-5-chloro-2'-(trifluoromethyl)-benzophenone: 1-[2-(α,α,α-trifluoro-o-toluoyl)-4-chlorophenyl]-5-(chloromethyl) - 1H - 1,2,4-triazole-3-carboxylic acid;

With the use of 53.8 g. (0.25 mole) of 2-amino-5-fluorobenzophenone: 1 - (2-benzoyl-4-fluorophenyl)-5-(chloromethyl)-1H-1,2,4-triazole-3-carboxylic acid;

With the use of 69.0 g. (0.25 mole) of 2-amino-5-bromobenzophenone: 1 - (2-benzoyl-4-bromophenyl) - 5-(chloromethyl)-1H-1,2,4-triazole - 3 - carboxylic acid;

With the use of 66.2 g. (0.25 mole) of 2-amino-5-(trifluoromethyl)-benzophenone: 1 - (2-benzoyl-α,α,α-trifluoro-p-tolyl) - 5 - chloromethyl) - 1H - 1,2,4-triazole-3-carboxylic acid;

With the use of 60.8 g. (0.25 mole) of 2-amino-5-nitrobenzophenone: 1 - (2-benzoyl - 4 - nitrophenyl)-5-(chloromethyl)-1H-1,2,4-triazole-3-carboxylic acid.

(c) An amount of 4.10 g. (0.01 mole) of 1-[2-(o-chlorobenzoyl) - 4 - chlorophenyl]-5-(chloromethyl)-1H-1,2,4-triazole-3-carboxylic acid and 3.20 g. (0.03 mole) of hexamethylene-tetramine is dissolved in 200 ml. of ethanol, and the solution refluxed for 12 hours. The solution is then concentrated at 40° in vacuo, the residue dissolved in 200 ml. of 0.05 N sodium hydroxide solution, and 2 N hydrochloric acid added until an acid reaction to a Congo-red indicator is obtained. The precipitated carboxylic acid is filtered off under suction, thoroughly washed with water to effect removal of the hydrochloric acid, washed afterwards with methanol, and dried at 120–130° in vacuo. The obtained 6-(o-chlorophenyl)-8-chloro-4H-s-triazolo[1,5-a][1,4]benzodiazepine - 2 - carboxylic acid decomposes at 205°.

The following are obtained analogously:

From 3.94 g. (0.01 mole) of 1-[2-(o-fluorobenzoyl)-4-chlorophenyl]-5-(chloromethyl)-1H-1,2,4 - triazole - 3 - carboxylic acid: 6-(o-fluorophenyl)-8-chloro - 4H-s-triazolo[1,5-a][1,4]benzodiazepine - 2 - carboxylic acid, decomposition at 179–182°;

From 3.76 g. (0.01 mole) of 1-[o-(o-chlorobenzoyl)-phenyl]-5-(chloromethyl)-1H-1,2,4-triazole-3 - carboxylic acid: 6-(o-chlorophenyl)-4H - s-triazolo[1,5-a][1,4]benzodiazepine-2-carboxylic acid;

From 4.44 g. (0.01 mole) of 1-[2-(α,α,α-trifluoro-o-toluoyl)-4-chlorophenyl]-5 - (chloromethyl)-1H - 1,2,4-triazole-3-carboxylic acid: 6-(α,α,α-trifluoro - o-tolyl)-8-chloro-4H-s-triazolo[1,5-a][1,4]benzodiazepine - 2 - carboxylic acid;

From 3.60 g. (0.01 mole) of 1-(2-benzoyl-4-fluorophenyl)-5-(chloromethyl)-1H-1,2,4-triazole-3 - carboxylic acid: 6-phenyl-8-fluoro-4H-s-triazolo[1,5 - a][1,4]benzodiazepine-2-carboxylic acid;

From 4.21 g. (0.01 mole) of 1-(2-benzoyl-4-bromophenyl)-5-(chloromethyl)-1H-1,2,4-triazole-3 - carboxylic acid: 6-phenyl-8-bromo-4H-s-triazolo[1,5-a][1,4 - benzodiazepine-2-carboxylic acid;

From 4.10 g. (0.01 mole) of 1-(2-benzoyl-α,α,α-trifluoro-p-tolyl)-5-(chloromethyl) - 1H - 1,2,4-triazole-3-carboxylic acid: 6-phenyl - 8 - (trifluoromethyl)-4H-s-triazolo[1,5-a][1,4]benzodiazepine-2-carboxylic acid;

From 3.87 g. (0.01 mole) of 1-(2-benzoyl - 4 - nitrophenyl)-5-(chloromethyl) - 1H - 1,2,4 - triazole - 3 - carboxylic acid: 6-phenyl-8-nitro - 4H-s - triazolo[1,5-a][1,4] benzodiazepine-2-carboxylic acid.

(d) Analogously to Example 1(e), there are obtained the following compounds from the given amount of the carboxylic acids, corresponding in each case to 0.006 mole, and with the use of 0.3 of the amounts given in Example 1(e) of thionyl chloride, sodium azide and solvents:

From 2.24 g. of 6-(o-chlorophenyl)-8-chloro-4H-s-triazolo[1,5-a][1,4]benzodiazepine-2-carboxylic acid: 6-(o-chlorophenyl)-8-chloro-4H-s-triazolo[1,5 - a][1,4]benzodiazepine-2-carboxylic acid azide, M.P. 144–148° (decomposition: from ether);

From 2.14 g. of 6-(o-fluorophenyl)-8-chloro-4H-s-triazolo[1,5-a][1,4]benzodiazepine-2-carboxylic acid: 6-(o-fluorophenyl)-8-chloro-4H - s-triazolo[1,5 - a][1,4]benzodiazepine-2-carboxylic acid azide, M.P. 205–210° (decomposition: from ether);

From 2.03 g. of 6-(o-chlorophenyl)-4H-s-triazolo[1,5-a][1,4]benzodiazepine - 2 - carboxylic acid: 6-(o-chlorophenyl)-4H-s-triazolo[1,5-a][1,4]benzodiazepine - 2 - carboxylic acid azide;

From 2.44 g. of 6-(α,α,α-trifluoro-o-tolyl)-8-chloro-4H-s-triazolo[1,5-a][1,4]benzodiazepine-2 - carboxylic acid: 6-(α,α,α-trifluoro-o-tolyl)-8-chloro-4H - s-triazolo[1,5 - a][1,4]benzodiazepine-2-carboxylic acid azide;

From 1.93 g. of 6-phenyl-8-fluoro-4H-s-triazolo[1,5-a][1,4]benzodiazepine-2-carboxylic acid: 6-phenyl-8-fluoro-4H-s-triazolo[1,5-a][1,4]benzodiazepine - 2 - carboxylic acid azide;

From 2.30 g. of 6-phenyl-8-bromo-4H-s-triazolo[1,5-a][1,4]benzodiazepine-2-carboxylic acid: 6-phenyl-8-bromo-4H-s-triazolo[1,5-a][1,4]benzodiazepine-2-carboxylic acid azide;

From 2.23 g. of 6-phenyl-8-(trifluoromethyl)-4H-triazolo[1,5-a][1,4]benzodiazepine - 2 - carboxylic acid: 6-phenyl - 8 - (trifluoromethyl)-4H - s - triazolo[1,5-a][1,4] benzodiazepine-2-carboxylic acid azide;

From 2.09 g. of 6-phenyl-8-nitro-4H-s-triazolo[1,5-a][1,4]benzodiazepine-2-carboxylic acid: 6-phenyl-8-nitro-4H-s-triazolo[1,5-a][1,4]benzodiazepine-2-carboxylic acid azide.

What we claim is:
1. A diazepine derivative having the Formula I

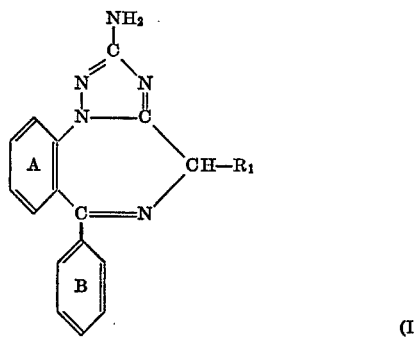

(I)

wherein $R_1$ represents a hydrogen atom or an alkyl group having from 1 to 3 carbon atoms, and
wherein each of the rings A and B, independently of the other, is unsubstituted or substituted by one or more chlorine atoms, fluorine atoms, bromine atoms, trifluoromethyl groups, nitro groups and/or alkyl and/or alkoxy groups having from 1 to 6 carbon atoms,
its 5-oxide and its pharmaceutically acceptable acid addition salts.

2. A compound according to claim 1 having the Formula I, wherein $R_1$ has the meaning given in claim 1 and wherein each of the rings A and B, independently of the other, is unsubstituted or substituted as defined in claim 1.

3. A compound according to claim 1 having the Formula I,
wherein $R_1$ is hydrogen and wherein each of the rings A and B, independently of the other, is unsubstituted or substituted by a single substituent as defined in claim 1,
its 5-oxide and its pharmaceutically acceptable acid addition salts.

4. A compound according to claim 1 having the Formula I, wherein $R_1$ is hydrogen and wherein each of the rings A and B independently of the other, is unsubstituted or substituted by a substituent of the group consisting of chlorine, fluorine, bromine, the trifluoromethyl group and the nitro group.

5. A compound according to claim 1 having the Formula I, wherein $R_1$ is hydrogen and wherein ring A is substituted in the 8-position by chlorine, fluorine, bromine, the trifluoromethyl group or the nitro group, and ring B is unsubstituted or substituted by chlorine, fluorine, bromine or the trifluoromethyl group.

6. A compound according to claim 1 having the Formula I, wherein $R_1$ is hydrogen and wherein ring A is substituted in the 8-position by chlorine and ring B is unsubstituted or substituted in the ortho-position by fluorine or chlorine.

7. A compound according to claim 1 which is 2-amino-6 - phenyl-8-chloro-4H-s-triazolo[1,5-a][1,4]benzodiazepine.

8. A compound according to claim 1 which is 2-amino-6 - (o - fluorophenyl) - 8-chloro-4H-s-triazolo[1,5-a][1,4]benzodiazepine.

9. A compound according to claim 1 which is 2-amino-6 - (o - chlorophenyl)-8-chloro-4H-s-triazolo[1,5-a][1,4]benzodiazepine.

References Cited
UNITED STATES PATENTS 3,703,525  11/1972  Tawada et al. _____ 260—308 R
3,709,899  1/1973   Hester _____ 260—308 R ALTON D. ROLLINS, Primary Examiner U.S. Cl. X.R.
260—141, 193, 570 AB; 424—269